United States Patent [19]

Edwards, Jr.

[11] Patent Number: 4,471,661
[45] Date of Patent: Sep. 18, 1984

[54] ELECTRONIC-TYPE VACUUM GAUGES WITH REPLACEABLE ELEMENTS

[76] Inventor: David Edwards, Jr., 7 Brown's La., Bellport, N.Y. 11713

[21] Appl. No.: 374,933

[22] Filed: May 5, 1982

[51] Int. Cl.³ .................... G01L 21/14; G01L 21/32; G01L 19/14
[52] U.S. Cl. ...................................... 73/753; 73/756; 73/755; 324/462
[58] Field of Search ................ 73/753, 754, 756, 755; 338/36; 250/379; 324/460, 462

[56] References Cited

U.S. PATENT DOCUMENTS

| | | | |
|---|---|---|---|
| 2,483,300 | 9/1949 | Howe | 338/36 X |
| 2,497,213 | 2/1950 | Downing | 73/753 X |
| 3,102,427 | 9/1963 | Trostel | 73/756 |
| 3,139,746 | 7/1964 | Noller | 324/460 X |
| 3,254,152 | 5/1966 | Finney et al. | 250/379 X |
| 3,267,326 | 8/1966 | Hayward et al. | 324/462 X |
| 3,326,046 | 6/1967 | Risher | 73/756 |
| 3,429,185 | 2/1969 | Piper et al. | 73/756 |
| 3,505,862 | 4/1970 | List et al. | 73/753 X |
| 3,587,322 | 6/1971 | Lobdell et al. | 73/756 |
| 3,707,874 | 1/1973 | Tuttle | 73/754 |
| 4,111,058 | 9/1978 | Gross | 73/756 X |
| 4,133,022 | 1/1979 | Moore et al. | 73/756 X |

FOREIGN PATENT DOCUMENTS 835532 4/1952 Fed. Rep. of Germany ........ 73/755

OTHER PUBLICATIONS

NBS Technical Note 298, A Survey of Ionization Vacuum Gages & Their Performance Characteristics, 2-1967.
The Measurement of Pressure in Industrial High Vacuum Systems, Instrument Praehze, 5-1960, pp. 519-527, Steckelmacher.

Primary Examiner—Jerry W. Myracle
Assistant Examiner—Tom Noland
Attorney, Agent, or Firm—Paul W. Garbo

[57] ABSTRACT

In electronic devices for measuring pressures in vacuum systems, the metal elements which undergo thermal deterioration are made readily replaceable by making them parts of a simple plug-in unit. Thus, in ionization gauges, the filament and grid or electron collector are mounted on the novel plug-in unit. In thermocouple pressure gauges, the heater and attached thermocouple are mounted on the plug-in unit. Plug-in units have been designed to function, alternatively, as ionization gauge and as thermocouple gauge, thus providing new gauges capable of measuring broader pressure ranges than is possible with either an ionization gauge or a thermocouple gauge.

16 Claims, 5 Drawing Figures

ELECTRONIC-TYPE VACUUM GAUGES WITH REPLACEABLE ELEMENTS

BACKGROUND OF THE INVENTION

This invention was made under, or during the course of, a contract with the United States Department of Energy. The Government has rights in this invention pursuant to Contract No. DE-AC02-76CH00016 awarded by the U.S. Department of Energy.

This invention relates to vacuum gauges of the electronic type in which a wire or filament is heated by the passage of an electric current therethrough, and more particularly to ionization gauges and thermocouple gauges.

Ionization and thermocouple gauges for measuring pressure in vacuum systems have received considerable technical attention so that many designs have been proposed and developed. Textbooks such as The Physical Basis of Ultrahigh Vacuum by Redhead et al, published by Chapman and Hall Ltd., and Scientific Foundations of Vacuum Technique by Dushman et al, published by John Wiley & Sons Inc., show various forms of these vacuum gauges. In spite of all the developments to date, electronic vacuum gauges still have some shortcomings that stem from the high temperatures used in these gauges and the resultant deterioration of the metal elements of the gauges. On one hand, the gauge may have a limited life before it breaks down and on the other hand, the gauge may be sturdy but expensive as illustrated by the ionization gauge of U.S. Pat. No. 3,891,882 to Barraco.

Accordingly, it is an object of this invention to provide electronic vacuum gauges of simple and economic construction.

A further object is to provide such gauges in which the metal elements that suffer from thermal deterioration are readily replaceable.

These and other objects and advantages of the invention will be apparent from the description which follows.

SUMMARY OF THE INVENTION

In accordance with this invention, electronic devices for the measurement of pressures in vacuum systems comprise a metal shell having a port for fluid communication with the vacuum system, at least two metal elements that are subjected to high temperature mounted on the end portions of metal posts extending through a support base formed of a heat-resistant, electrical insulator, the opposite end portions of the metal posts providing electrically conductive pins and the support base with the metal posts being a replaceable plug-in unit within the metal shell, and a wired receptacle to receive the pins of the plug-in unit disposed in the metal shell with its wires extending hermetically through the metal shell.

The concept of forming a simple replaceable plug-in unit carrying the metal elements of the gauge which are subject to thermal deterioration makes it possible to make all the parts of the plug-in unit light and small so that the cost is reduced. Hence, not only is it less expensive to replace the plug-in unit of this invention rather than the entire gauge when a breakdown occurs but also miniaturization enhances the economic advantage of the replaceable plug-in unit over prior gauges.

Thus, the support base of the plug-in unit will usually be a disk of not more than about 0.5 inch diameter and not more than about 0.3 inch thickness. The heat-resistant, electrical insulator forming the support base may be a glass, ceramic or plastic product such as polytetrafluoroethylene.

The metal elements are generally made of wire of about 0.004 to 0.007 inch diameter and when formed into a coil will frequently have overall dimensions of not more than about 0.05 inch diameter and not more than about 0.75 inch length. Tungsten wire of about 0.005 inch diameter is often preferred to provide one or more elements of the plug-in unit of this invention.

BRIEF DESCRIPTION OF THE DRAWINGS

Further clarification of the invention will become apparent from the following description which is presented in relation to the accompanying drawings of which.

DESCRIPTION OF PREFERRED EMBODIMENTS

Figure 1:
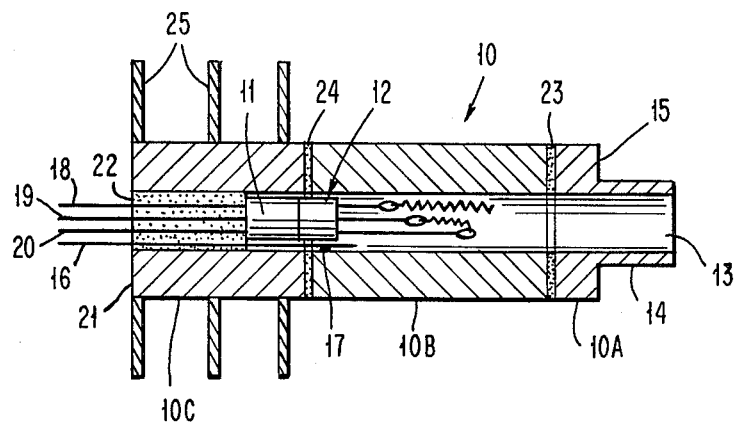
FIG. 1 is an axial cross section of a preferred ionization gauge of the invention.

The ionization gauge of FIG. 1 has metal shell 10 which holds wired receptacle 11 with plug-in unit 12 seated therein. While shell 10 may be simply a unitary metal tube of uniform wall thickness, it is shown to be made up of three sections 10A, 10B, 10C. Section 10A provides port 13 for fluid communication with the vacuum system which is to be monitored for pressure. Free end 14 of section 10A is turned down to a reduced diameter for connection to the vacuum system. Free end 14 is fitted into an appropriate holder of the vacuum system with an O-ring or other gasket captured by shoulder 15 to ensure a perfect hermetic seal between the ionization gauge and the vacuum system. Free end 14 may be threaded if it is desired to attach the gauge by screwing it into a threaded fitting of the system.

Wire 16 is connected to section 10B at soldering, welding or other suitable method of making an electrical connection. Wired receptacle 11 is held in section 10C with its wires 18, 19, 20 extending out of free end 21. Wire 16 also extends out of end 21. Epoxy cement 22 or other sealant hermetically fills and seals free end 21. Epoxy cements is also conveniently used to provide hermetic connection 23 between section 10A and 10B, and hermetic connection 24 between sections 10B and 10C. Because of the heat generated during operation of the ionization gauge, it is advisable to have metal fins 25 attached to metal shell 10 to promote the dissipation of heat.

Figures 2, 3, 4, 5:
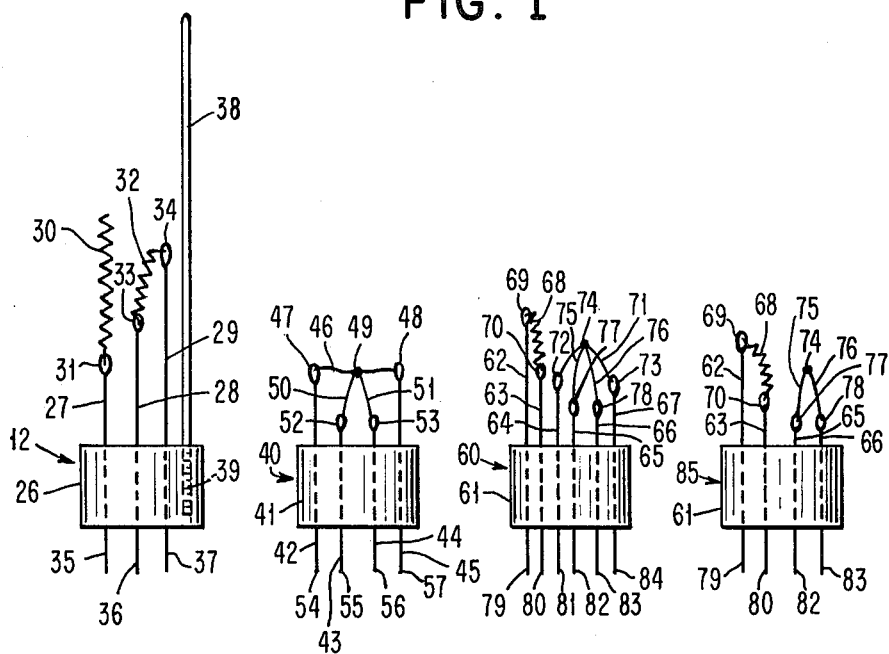
FIG. 2 is an enlarged longitudinal view of the plug-in unit used in the gauge of FIG. 1.
FIG. 3 is a similar longitudinal view of a plug-in unit for a thermocouple gauge of this invention.
FIG. 4 is a longitudinal view of a plug-in unit for a novel combined ionization and thermocouple gauge.
FIG. 5 is a longitudinal view of a plug-in unit for another novel combined ionization and thermocouple gauge.

FIG. 2 shows that plug-in unit 12 has support base 26 with three metal posts 27, 28, 29 extending therethrough. Wire coil 30 is attached to end 31 of post 27 to provide the grid or electron collector of the ionization gauge. Wire coil 32 has its ends attached to end 33 of post 28 and end 34 of post 29 and is the filament of the gauge. A simple and effective method of attaching coils 30 and 32 to post ends 31, 33, 34 involves pressing dissimilar metals together. Thus, tungsten wire is embedded or implanted in copper as taught in Journal of Vacuum Science and Technology, Vol. 16, No. 3, May/June 1979, by D. Edwards, Jr. For this reason, ends 31, 33, 34 are shown flattened relative to the thin cylindrical posts 27, 28, 29 which pass through support base 26 and terminate as pins 35, 36, 37 of plug-in unit 12.

Receptacle 11 made of an electrical insulator contains three sockets into which pins 35, 36, 37 fit and make electrical connection with wires 18, 19, 20. Thus, an electric current can be supplied to filament 32 through wires 19, 20, pins 36, 37, and posts 28, 29, and the resulting electron current can flow from grid 30 through post 27 and pin 35 to wire 18. Section 10B of metal shell 10 is the positive ion collector of the ionization gauge and the positive ion current can flow from ion collector 10B through wire 16. Alternatively, wire 16 may be attached to the exterior surface of positive ion collector 10B if the neat appearance of the gauge as shown in FIG. 1 is regarded unimportant. Of course, wires 16, 18, 19, 20 have an insulation coating to prevent any short-circuiting.

Epoxy cement connection 23 electrically insulates ion collector 10B from section 10A and the vacuum system to which it is attached. If, as previously mentioned, shell 10 is a single length of a metal tube, all of the tube is the ion collector of the ionization gauge and the tube may be electrically isolated from the vacuum system by an insulating material disposed in the connection between the tube and the vacuum system. To ensure a strong bond by cement connections 23, 24, the wall thickness of sections 10A, 10B, 10C is thicker than is necessary when shell 10 is a unitary tube.

Shown only in FIG. 2 is rod 38 with a threaded end screwed into threaded hole 39 in support base 26 of plug-in unit 12. Rod 38 is used to insert plug-in unit 12 through port 13 until pins 35, 36, 37 are seated in their corresponding sockets in receptacle 11. Then rod 38 is unscrewed from support base 26 and withdrawn from shell 10. When it is desired to replace plug-in unit 12, rod 38 is inserted through port 13 and rotated so that its threaded end is screwed into threaded hole 39 in base 26. With rod 38 attached to base 26, rod 38 is pulled to disconnect pins 35, 36, 37 from their sockets in receptacle 11 and is withdrawn from shell 10 to take out plug-in unit 12.

FIG. 3 shows plug-in unit 40 for a thermocouple gauge designed to measure pressures in vacuum systems. Support base 41 of plug-in unit 40 has four metal posts 42, 43, 44, 45 extending therethrough. Heater wire 46 is attached to ends 47, 48 of posts 42, 45, respectively, desirably by implanting tungsten wire 46 into copper posts 42, 45, as previously discussed in relation to plug-in unit 12 of FIG. 2. Junction 49 of dissimilar thermocouple wires 50, 51 is attached to heater 46 preferably by soldering or welding. Wire 50 is connected to end 52 of post 43 and wire 51 is connected to end 53 of post 44 by implantation or other known method. The opposite, free ends 54, 55, 56, 57 of posts 42, 43, 44, 45 provide the pins of plug-in unit 40 for insertion into corresponding sockets of a wired receptacle (not shown) similar to receptacle 11 of FIG. 1. The receptacle for plug-in unit 40 will have four wires extending hermetically through the metal shell of the thermocouple gauge. In this case, a wire attached to the shell like wire 16 of FIG. 1 is not required.

Plug-in unit 60 of FIG. 4 is designed for a novel combined ionization and thermocouple gauge, and has support base 61 with six metal posts 62, 63, 64, 65, 66, 67 extending therethrough. Wire coil 68 is attached to ends 69, 70 of posts 62, 63 to act as the filament of the ionization gauge. Heater wire 71 is connected to ends 72, 73 of posts 64, 67. Junction 74 of dissimilar thermocouple wires 75, 76 is welded to heater 71. Wires 75, 76 are connected to ends 77, 78 of posts 65, 66. The free ends of posts 62, 63, 64, 65, 66, 67 provide pins 79, 80, 81, 82, 83, 84 for insertion into corresponding sockets of a wired receptacle having six wires connected thereto. The metal shell of the new combined gauge has a wire attached to it so that when the gauge is used as an ionization gauge the shell acts as the ion collector as already explained in relation to wire 16 of FIG. 1.

To operate the combined gauge comprising a metal shell and plug-in unit 60 as an ionization gauge, an electric current is passed through filament 68 by way of pins 79, 80 and posts 62, 63. Any one or more of wires 71, 75, 76 and associated posts 64, 65, 66, 67 may be used as the electron collector while the shell acts as the ion collector.

Alternatively, when the gauge with plug-in unit 60 is operated as a thermocouple gauge, an electric current is passed through heater 71 by way of pins 81, 84 and posts 64, 67. As known, the temperature of hot junction 74 of thermocouple wires 75, 76 varies with the pressure in the vacuum system and the resulting variations in electromotive force of the thermocouple are monitored by way of posts 65, 66 and pins 82, 83.

Plug-in unit 85 of FIG. 5 is for a simplified form of the new combined ionization and thermocouple gauge and is identical to plug-in unit 60 of FIG. 4 except that heater 71 and associated posts 64, 67 have been eliminated. When the gauge with plug-in unit 85 functions as an ionization gauge, filament 68 emits the electrons required to ionize gas molecules within the shell of the gauge and the shell acts as the ion collector as previously explained relative to plug-in unit 60 of FIG. 4. Either or both of thermocouple wires 75, 76 and associated posts 65, 66 serve as the electron collector of the ionization gauge.

Alternatively, to use the gauge containing plug-in unit 85 as a thermocouple gauge, an electric current is passed through filament 68 and its posts 62, 63 so that filament 68 acts as the heater of junction 74 of thermocouple wires 75, 76 by radiation and convection. Variations of the electromotive force of the thermocouple resulting from temperature changes of junction 74 because of pressure variations in the vacuum system to which the gauge is connected are monitored through posts 65, 66 and pins 82, 83.

While not shown, each of support bases 41 and 61 of FIGS. 3, 4 and 5 may have a threaded hole like hole 39 in base 26 of FIG. 2 into which rod 38 can be screwed to facilitate the removal of plug-in units 40, 60 and 85 from the shells of their respective gauges.

In discussing the operation of ionization gauges containing plug-in units 12, 60, 85, it has been pointed out that metal shell 10 is wired to act as the positive ion collector. This arrangement simplifies the construction of plug-in units 12, 60, 85 and provides a large effective ion collector. However, the ion collector may be made a part of plug-in units 12, 60, 85 by adding another metal post to support bases 26, 61 and attaching a wire coil or metal plate or ribbon to that post. In such case, the receptacle for the modified plug-in units will have an additional wired socket to receive the pin of the post to which the ion collector is attached, and wire 16 of FIG. 1 will be eliminated.

To illustrate the simplicity and compactness of a gauge of this invention and particularly the miniaturization of the metal elements therein which periodically need replacement, a specific gauge as shown in FIG. 1 will be described.

Shell 10 is an aluminum tube with a 1 inch outside diameter and 0.41 inch inside diameter. Three aluminum fins 25 have a 2 inch outside diameter. Epoxy cement joints 23, 24 hold sections 10A, 10B, 10C together as shell 10 measuring 3.5 inches in length.

Plug-in unit 12 has support base 26 in the form of a polytetrafluoroethylene disk of 0.38 inch diameter and 0.28 inch thickness. Posts 27, 28, 29 are copper wire of 0.05 inch diameter. Coils 30, 32 are formed of tungsten wire of 0.005 inch diameter and have a coil diameter of 0.05 inch. Coil 30 has 12 turns and a length of 0.45 inch. Coil 32 with 5 turns has a length of 0.3 inch. Coils 30, 32 are attached to posts 27, 28, 29 by the implantation technique of D. Edwards, Jr. The longest dimension of plug-in unit 12 measured from the free end of coil 30 to the end of pin 35 is 1.4 inches.

Receptacle 11 is also made of polytetrafluoroethylene and is held in place in section 10C by epoxy cement which also surrounds copper wires 16, 18, 19, 20 and fills free end 21 of section 10C to provide a hermetic seal thereof.

This specific ionization gauge is suitable for measuring pressures in the range of $5 \times 10^{-7}$ Torr to 0.1 Torr. Filament 32 operates with 2 amperes at 2 volts. The sensitivity of the gauge is linear up to a pressure of 0.015 Torr. The gauge can be used with any controller capable of supplying an emission current of 60 microamperes.

Thus it is evident that the invention has made it possible to miniaturize the metal elements of an electronic pressure gauge which with use undergo thermal deterioration and to make these elements part of a simple replaceable plug-in unit. It is noteworthy that the economies resulting from the novel design of electronic pressure gauges are achieved without diminishing the performance of the gauges.

In fact, the miniaturization of the metal elements and their disposition in close proximity to one another has led to the new dual or combined gauge which can be used as an ionization gauge or as a thermocouple gauge and thus a broader range of pressures can be measured. For example, a gauge equipped with plug-in unit 60 of FIG. 4 can be used as an ionization gauge to measure pressures in the range of about $10^{-6}$ Torr to 0.1 Torr and as a thermocouple gauge to measure pressures in the range of about 0.01 Torr to 1000 Torr.

Those skilled in the art will visualize many variations and modifications of the invention, as illustrated by the foregoing disclosure, without departing from its spirit and scope. For instance, each of metal posts 27, 28, 29 need not be a single piece of wire but may be formed of two parts: pins 35, 36, 37 being thin brass tubes held in support base 26 and posts 27, 28, 29 being copper wire joined to tubular pins 35, 36, 37 in tight telescopic joints. Also, cement joint 24 may be eliminated and the contiguous ends of sections 10B, 10C may be threaded so that these sections can be screwed together. Such a screw joint facilitates the replacement of plug-in unit 12 because section 10C can be separated from section 10B. In such case, wire 16 is attached to section 10C and, obviously, plug-in unit 12 can be simply pulled away from receptacle 11 with one's fingers, obviating rod 38 or equivalent means required when access to unit 12 is only through port 13. Accordingly, only such limitations should be imposed on the scope of the invention as are set forth in the appended claims.

What is claimed is:

1. A thermocouple gauge for the measurement of pressures below 1000 Torr in a vacuum system comprising a metal shell having a port for fluid communication with said vacuum system to be measured and within said shell a replaceable plug-in unit with electrically conductive pins having a support base formed of a heat-resistant, electrical insulator, and four metal posts extending through said base, on one side of said base a heater mounted on the end portions of two of said metal posts and a thermocouple mounted on the end portions of the other two of said metal posts, and on the opposite side of said base the end portions of said posts providing said electrically conductive pins of said plug-in unit, and a wired receptacle to receive said pins with its wires extending hermetically through said shell.

2. Thermocouple gauge of claim 1 wherein the heater is a platinum wire, one wire of the thermocouple is iron or copper, the other wire of said thermocouple is Constantan, and the junction of said thermocouple is fastened to said heater.

3. An ionization gauge for the measurement of pressures below 1000 Torr in a vacuum system comprising a metal shell having a port for fluid communication with said vacuum system to be measured and within said shell a replaceable plug-in unit with electrically conductive pins having a support base formed of a heat-resistant, electrical insulator, and three metal posts extending through said base, on one side of said base a filament with its ends mounted on the end portions of two of said metal posts and an electron collector mounted on the end portion of the third metal post, and on the opposite side of said base the end portions of said posts providing said electrically conductive pins of said plug-in unit, a wired receptacle to receive said pins with its wires extending hermetically through said shell, and a wire connected to said shell so that said shell is the ion collector of said ionization gauge.

4. The ionization gauge of claim 3 wherein the filament is a fine wire in the form of a coil not more than about 0.05 inch in diameter and about 0.25 inch in length, and the electron collector is a fine wire in the form of a coil not more than about 0.05 inch in diameter and about 0.75 inch in length.

5. The ionization gauge of claim 4 wherein the support base and the receptacle are formed of a heat-resistant plastic, and metal fins are attached to the exterior of the metal shell to increase heat dissipation.

6. The ionization gauge of claim 5 wherein the fine wire of the filament and the electron collector is tungsten wire of about 0.005 inch in diameter.

7. The ionization gauge of claim 6 wherein the three metal posts are copper and the tungsten wire ends of the filament and electron collector are mounted thereon by pressing until said tungsten wire is embedded in said copper.

8. The ionization gauge of claim 3 wherein the support base and the receptacle are formed of a heat-resistant plastic, and said support base has a threaded hole to receive a threaded rod used to withdraw the plug-in unit from said receptacle through the port of the metal shell.

9. The ionization gauge of claim 8 wherein the support base is a disk not more than 0.5 inch in diameter, and metal fins are attached to the exterior of the metal shell to increase heat dissipation.

10. A combined ionization gauge and thermocouple gauge for the measurement of pressures below 1000 Torr in a vacuum system comprising a metal shell having a port for fluid communication with said vacuum system, within said shell a replaceable plug-in unit with metal posts extending through a support base formed of a heat-resistant, electrical insulator, the end portions of said posts on one side of said base having mounted thereon at least the filament of said ionization gauge and the thermocouple of said thermocouple gauge and the end portions of said posts on the other side of said base providing the electrically conductive pins of said plug-in unit, and a wired receptacle to receive said pins with its wires extending hermetically through said shell.

11. The combined gauge of claim 10 wherein the metal shell is wired to act as the ion collector of the ionization gauge, and metal fins are attached to the exterior of said shell to increase heat dissipation.

12. The combined gauge of claim 11 wherein the support base and the receptacle are formed of a heat-resistant plastic, and said support base has a threaded hole to receive a threaded rod used to withdraw the plug-in unit from said receptacle through the port of the metal shell.

13. The combined gauge of claim 10 wherein the support base and the receptacle are formed of a heat-resistant plastic, and metal fins are attached to the exterior of the metal shell to increase heat dissipation.

14. The combined gauge of claim 13 wherein the filament is tungsten wire of about 0.005 inch in diameter in the form of a coil not more than about 0.05 inch in diameter and about 0.25 inch in length.

15. The combined gauge of claim 14 wherein the tungsten wire filament is mounted on copper posts by pressing until said tungsten wire is embedded in said copper posts.

16. The combined gauge of claim 10 wherein a heater for the thermocouple is mounted on the end portions of two metal posts, the metal shell is wired to act as the ion collector of the ionization gauge, and the junction of said thermocouple is fastened to said heater.

* * * * *